June 1, 1926.
J. A. MYERS
1,587,348
FOLDABLE AND ADJUSTABLE HOG CHUTE
Filed Sept. 22, 1925    2 Sheets-Sheet 1
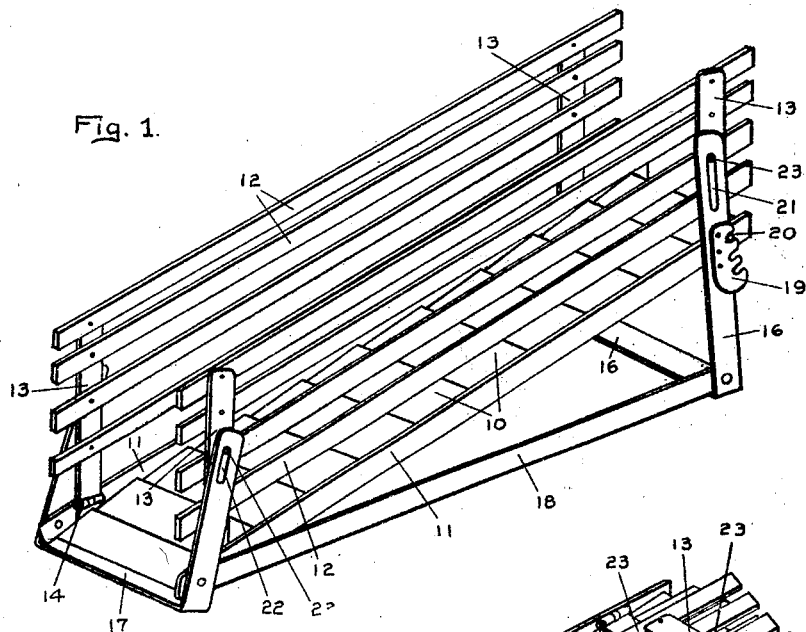
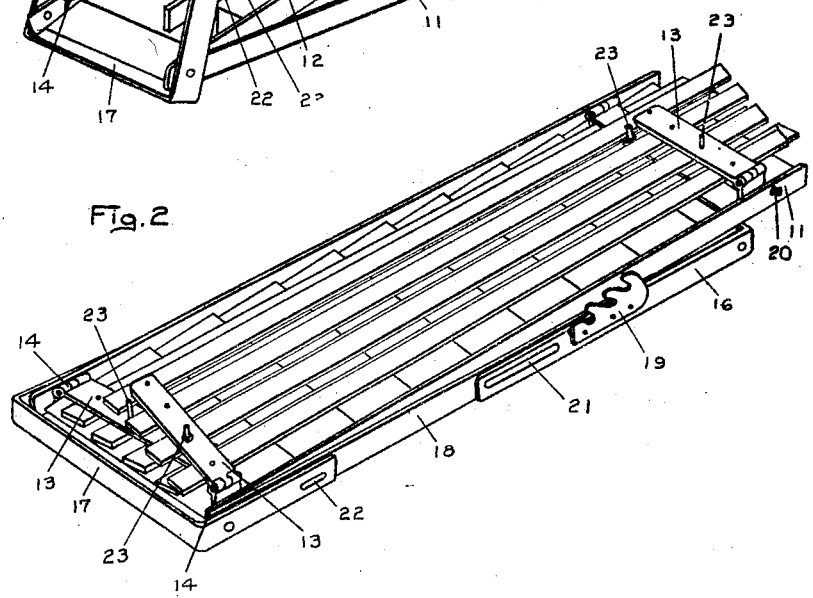
J. A. MYERS INVENTOR.
BY Emil F. Lange
ATTORNEY June 1, 1926.
J. A. MYERS
1,587,348
FOLDABLE AND ADJUSTABLE HOG CHUTE
Filed Sept. 22, 1925    2 Sheets-Sheet 2
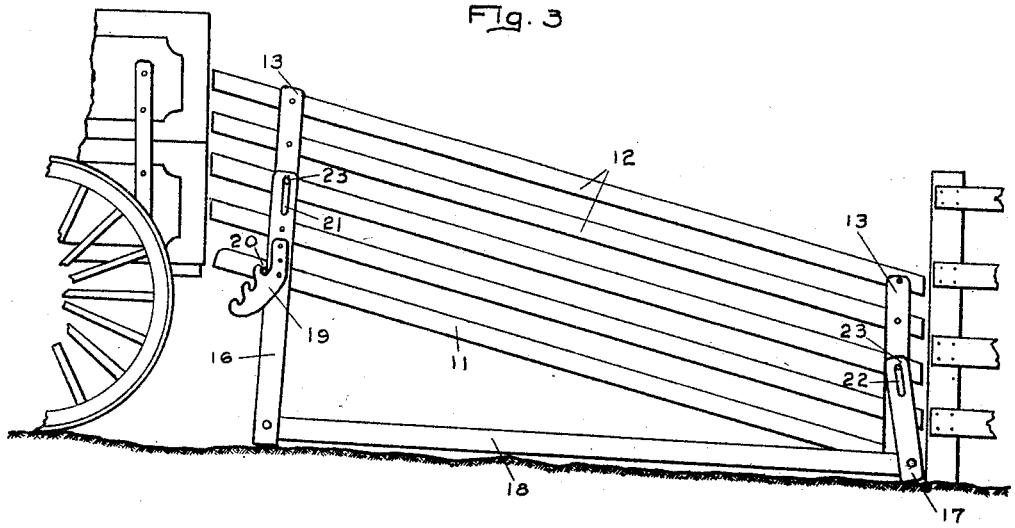
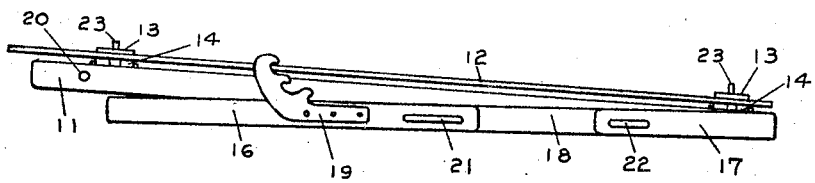
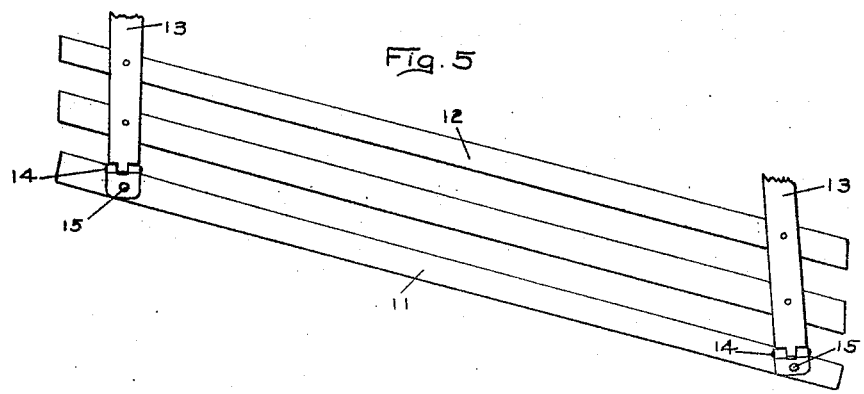
J. A. MYERS  INVENTOR.
BY *Emil F. Lange*
ATTORNEY Patented June 1, 1926.

1,587,348

UNITED STATES PATENT OFFICE.

JOHN A. MYERS, OF ALBION, NEBRASKA.

FOLDABLE AND ADJUSTABLE HOG CHUTE.

Application filed September 22, 1925. Serial No. 57,977.

My invention relates to chutes for loading heavy live stock into a farm wagon or for unloading it from the wagon.

The hog chute is a part of the necessary equipment of every farm. In nearly all cases this in an improvised homemade affair built of odds and ends of lumber found on the farm. It occupies considerable space and cannot therefore be placed under shelter when not in use, the result being that the wind and rain and sun warp the lumber of which it is made. Such a hog chute is portable only in a limited way. It may be dragged on the ground, but this loosens the parts. It is so heavy that it can be loaded on the wagon only with considerable difficulty, and after it is on the wagon, the jarring over rough roads makes repairs necessary. The result is that whenever a load of hogs is brought onto the farm or is to be hauled away from the farm, the hog chute requires several hours of repairing before it can be used.

My invention has for its object the provision of a foldable hog chute which is light in weight, which is rugged and durable, and which possesses certain novel features in its construction.

Having in view these objects and others which will be pointed out in the following description, I will now refer to the drawings in which—

Figure 1 is a view in perspective of the hog chute as it appears when set up.

Figure 2 is a perspective view of the same hog chute as it appears when folded.

Figure 3 is a side elevation of the hog chute in position between the pen and wagon.

Figure 4 is a side elevation of the folded hog chute.

Figure 5 is a view of a portion of one of the side walls of the hog chute, showing certain details of construction.

The floor of the chute consists of slats 10 which are arranged in inbricated relation to furnish treads for the animals, the slats being of a convenient width for this purpose. These slats are secured at their ends to the angle iron side members 11. The side walls are made by pivotally securing the slats 12 to the straps 13, the straps being hinged to the vertical webs of the angle iron side members 11 shown in Figure 5. As shown, the hinge includes two pins 14 and 15, the pin 14 being lengthwise of the frame while the pin 15 is transverse of the frame. The purpose of this construction will be explained subsequently in the description. It should be noted that one pair of pins 14 is positioned at a higher level than the other pair so that one of the side walls may be folded down onto the other side wall as shown in Figure 2.

The base of the hog chute comprises two bails 16 and 17 pivotally secured to the side members 18, the side members 11 of the floor being connected to the base by the pivot whereby the bail 17 is secured to the side members 18. When folded, the bails 16 and 17 and the side members 18 form a structure of single thickness. The bail 16 has secured thereto a pair of rack members 19 which engage projecting pins 20 at the side of the side members 11 of the floor of the chute, the rack 19 and the pins 20 making it possible to adjust the height of the front end of the chute to the height of the floor of the wagon box.

For preventing the side walls from folding inwardly while in use, slots 21 and 22 are formed in the bails 16 and 17, respectively, these slots being adapted to engage bolts 23 which project from the side walls. In use it is only necessary to thread nuts onto the bolts 23 to hold the parts secured. The slots 21 and 22 have, however, a more important function in relation to the adjustment on the rack 19. Were it not for the pivots 15 it would be impossible to fold the side members about the pivots 14 from the position shown in Figures 1 and 3. If the pivots 14 were always lengthwise of the chute frame, the side walls of the chute would be unfolded so as to leave the fore and rear edges of the chute oblique with reference to the wagon and to the wall of the pen. Such arrangement would leave gaps and possible weak spots which would certainly be seized upon by obstreperous hogs, resulting in the breakage of some of the slats. The slats of the side walls are pivotally connected to the straps 13 and the pivotal movement of the slats maintains them in parallel relation. The position of the slats is determined by the pins 23, this being the position of the slats with their front and rear ends in vertical alignment, and this position is determined by the pins 23 for every position of adjustment on the rack 19.

When folded as shown in Figures 2 and 4 the hog chute is very compact, occupying very little space. It is also light in weight and may easily be loaded on the farm wagon, and because it occupies so little space it may be carried on the wagon with the load of hogs. When it is desired to use the chute it is placed on the ground and is set up on the base 18. The bails 16 and 17 are first raised to the positions shown in Figures 1 and 3 and the front end of the floor is then raised until the pins 20 engage in the notches of the racks 19. This engagement fixes the angular position of the bail 16 and of course determines the position of the slots 21. The side walls are next unfolded about the pivots 14 and 15, the top portions of the side walls being moved forward until the pins 23 engage in the slots 21. This forward movement of the upper portions of the side walls is absolutely necessary for positioning the pins 23 within the slots 21 and it results in the vertical positioning of the fore and rear edges of the side walls. The bail 17 is then angularly adjusted until the slots 22 will engage the pins 23 on the rear portion of the side walls. If then the front edge of the floor of the chute happens to be either too high or too low, it may be lowered or raised to the proper height and then latched in the appropriate notches of the rack 19. Such adjustment of the floor also results in a parallel movement of the slots 12 on the straps 13 to always maintain the fore and rear edges of the side walls vertical.

When set up the hog chute is placed with its lower end against the gate of the hog lot, and the wagon with its end gate removed is backed up against the higher end of the chute as shown in Figure 3. The hogs may then be loaded onto the wagon by opening the gate of the hog lot and driving the hogs up on the inclined floor, or they may be unloaded from the wagon into the pen by driving them down.

Having thus described my invention in such full, clear and exact terms that its construction, utility, and mode of operation will be readily understood by others skilled in the art to which it pertains, what I claim as new and desire to secure by Letters Patent of the United States is:—

1. In a foldable hog chute, a floor comprising a pair of angle iron side members positioned with inwardly projecting lower webs, and transverse slats secured at their ends to the lower webs of said angle iron side members, said slats being overlapping to provide a tread at the forward edge of each slat.

2. In a foldable hog chute, a floor, foldable side walls therefor, each of said side walls having a pair of hinges connecting the side wall to the floor, each of said hinges having two pivot pins which are perpendicular to each other, and means for latching said side walls in a position substantially perpendicular to said floor.

3. In a foldable hog chute, a floor, and side walls therefor, each of said side walls comprising a plurality of parallel rails, a pair of straps each pivotally secured to all of said rails, each of said straps being pivotally secured at its lower extremity to said floor at the lateral edge thereof, and means for latching said side walls in perpendicular relation to said floor.

4. In a foldable hog chute, a floor and side walls therefor, each of said side walls comprising a plurality of parallel rails, a pair of straps each pivotally secured to all of said rails, each of said straps being pivotally secured at its lower extremity to said floor at the lateral edge thereof, and means for latching said side walls in perpendicular relation to said floor, said latching means being operative only when the fore and rear edges of the side walls are substantially vertical.

5. In a foldable hog chute, a floor and side walls, a support for holding the forward extremity of said floor elevated, each of said side walls comprising a plurality of parallel rails and a pair of straps, each of said straps being pivotally secured to all of said rails, means connecting said straps to the said floor at the lateral edges thereof for permitting the folding of said side walls into parallelism with said floor and for also permitting pivotal movement between said rails and straps when the side walls are perpendicular to the floor, and means associated with said support for latching said side walls in perpendicular relation to said floor, said latching means being operative only when the front and rear extremities of said rails have been brought into vertical alignment by the pivotal adjustment of said rails on said straps.

6. In a foldable hog chute, a base including a pair of side members, a floor pivotally secured at its rear extremity to said side members, a bail pivotally secured to said side members at the forward extremities thereof, said bail being pivotally movable to a position with its legs projecting upwardly, and means on said legs for engaging the said floor to secure the forward portion thereof at any one of several points of elevation.

7. A foldable hog chute including a floor and foldable side walls therefor, a base for said hog chute, said base including a pair of side members pivotally secured to said floor at the rear extremity thereof, a rear bail pivotally secured to said side members and to said floor, said rear bail and side members and floor having a common pivot, a front bail pivotally secured to said side members, each of said bails being adapted to be positioned with their legs projecting upwardly from said side members, means on said front bail for engaging said floor to hold the forward portion thereof at any one of a plurality of elevated positions, and means for latching said side walls to the legs of both of said bails, said rear bail being the bottom tread of said floor when the hog chute is in set-up position.

In witness whereof I affix my signature.

JOHN A. MYERS.